US011418659B2

(12) United States Patent
Hosoda

(10) Patent No.: US 11,418,659 B2
(45) Date of Patent: Aug. 16, 2022

(54) INFORMATION PROCESSING APPARATUS AND METHOD FOR CONTROLLING INFORMATION PROCESSING APPARATUS COMPRISING UTILIZING HARDWARE NUMERIC KEYS FOR CHARACTER STRING INPUT INTO INPUT REGIONS AND PRESSING AN INPUT REGION MULTIPLE INSTANCES TO DISPLAY A SOFTWARE KEYBOARD FOR CHARACTER STRING INPUT INTO AN INPUT REGION

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/030,178

(22) Filed: Jul. 9, 2018

(65) Prior Publication Data

US 2019/0020773 A1 Jan. 17, 2019

(30) Foreign Application Priority Data

Jul. 12, 2017 (JP) .............................. JP2017-136587

(51) Int. Cl.
*H04N 1/00* (2006.01)
*G06F 3/12* (2006.01)
*G06F 21/31* (2013.01)
*G06F 3/04886* (2022.01)

(52) U.S. Cl.
CPC ....... *H04N 1/00411* (2013.01); *G06F 3/1204* (2013.01); *G06F 3/1222* (2013.01); *G06F 3/1238* (2013.01); *G06F 3/1256* (2013.01); *G06F 21/31* (2013.01); *H04N 1/00514* (2013.01); *G06F 3/04886* (2013.01)

(58) Field of Classification Search
CPC .... G06F 3/1222; G06F 3/1238; G06F 3/1256; G06F 3/1204; G06F 21/31; H04N 1/00411; H04N 1/00514
USPC ............................................... 358/1.11–1.18
See application file for complete search history.

(56) References Cited

U.S. PATENT DOCUMENTS

| | | | | |
|---|---|---|---|---|
| 2011/0128247 A1* | 6/2011 | Sensu | .................. | H04N 1/0049 345/173 |
| 2011/0242024 A1* | 10/2011 | Fukumoto | .......... | H04N 1/00424 345/173 |
| 2011/0255100 A1* | 10/2011 | De Munck | ............. | B41J 3/4075 358/1.6 |

(Continued)

FOREIGN PATENT DOCUMENTS

| | | |
|---|---|---|
| JP | 2009157753 A | 7/2009 |
| JP | 2015219680 A * | 12/2015 |

*Primary Examiner* — Chad Dickerson
(74) *Attorney, Agent, or Firm* — Canon U.S.A., Inc. IP Division

(57) ABSTRACT

A method for controlling an information processing apparatus includes executing first input processing to receive a first input instruction of characters to the input region for input characters while the input region is being displayed, executing second input processing to receive a second input instruction of characters to the input region while the input region is not being displayed. Whether to execute the first input processing or the second input processing is determined according to a user operation for input of at least any of letters, numerals, and symbols in the input region.

15 Claims, 7 Drawing Sheets

(56) References Cited

U.S. PATENT DOCUMENTS

| | | | |
|---|---|---|---|
| 2012/0036485 A1* | 2/2012 | Watkins, Jr. | G06F 1/1626 |
| | | | 715/863 |
| 2013/0027312 A1* | 1/2013 | Okabayashi | G06F 3/04886 |
| | | | 345/168 |
| 2013/0027313 A1* | 1/2013 | Miyamoto | G06F 3/0233 |
| | | | 345/168 |
| 2014/0118784 A1* | 5/2014 | Ichiyama | H04N 1/00411 |
| | | | 358/1.15 |
| 2018/0046849 A1* | 2/2018 | Lapiz | G06K 9/00181 |

* cited by examiner

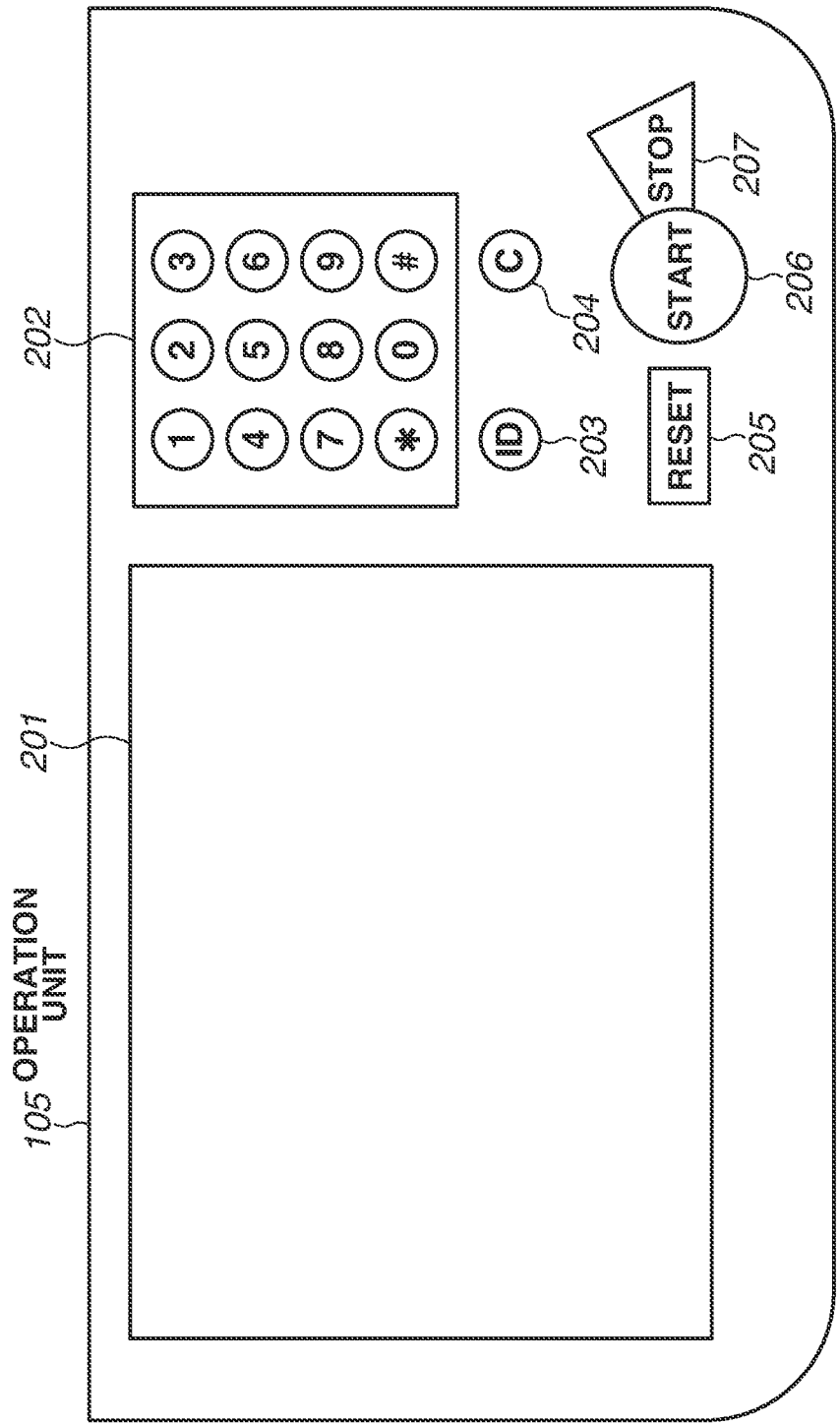

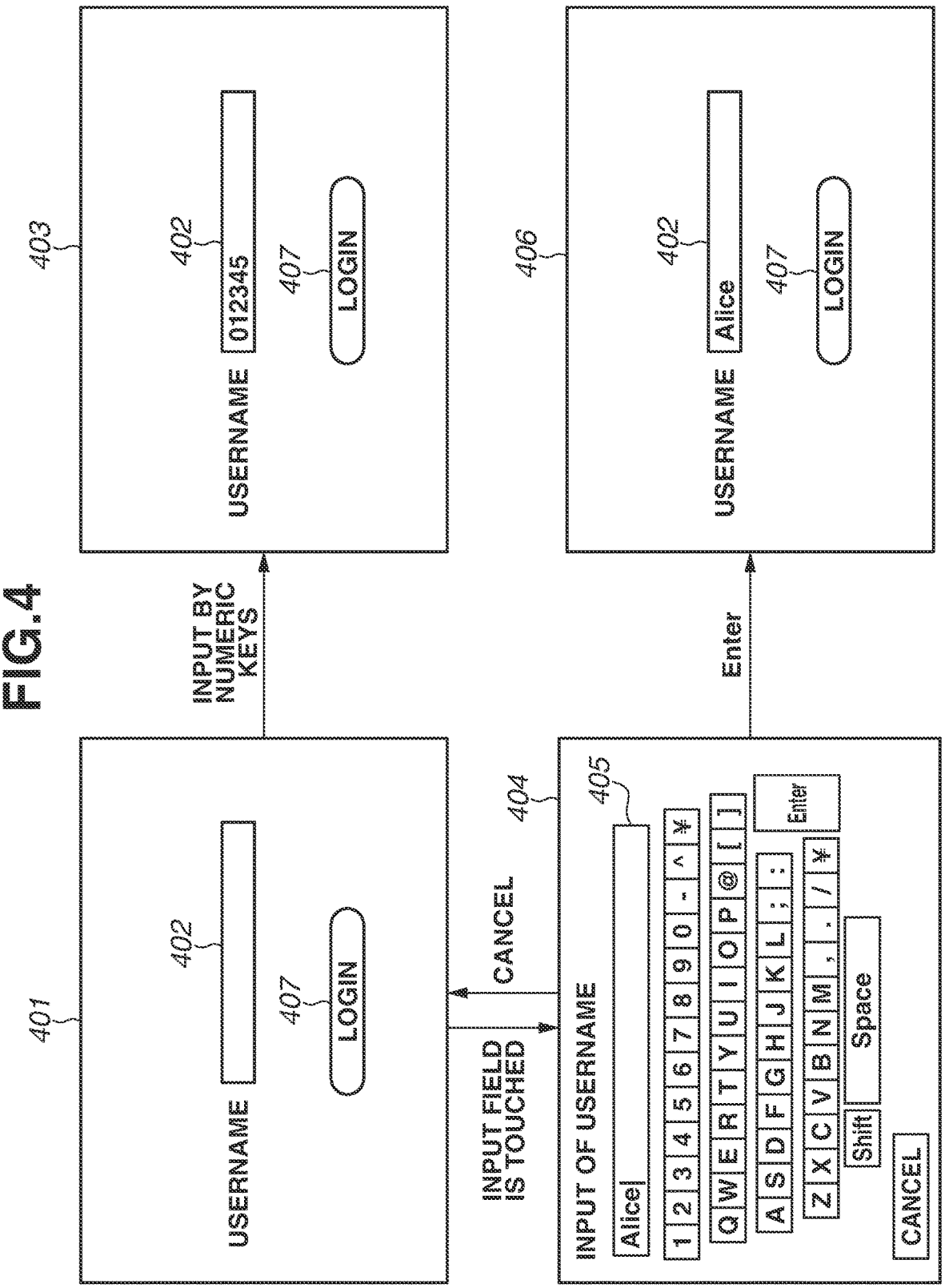

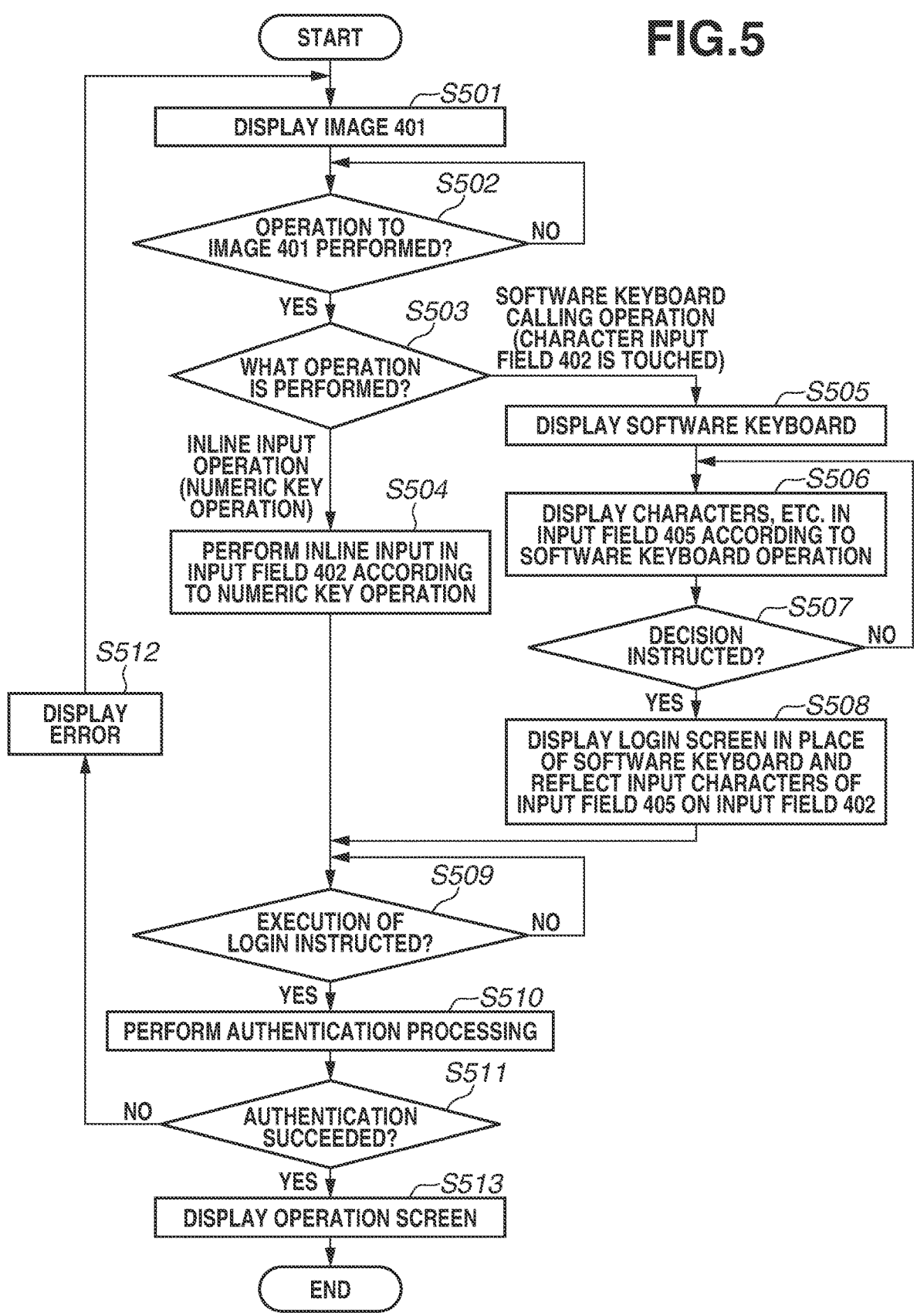

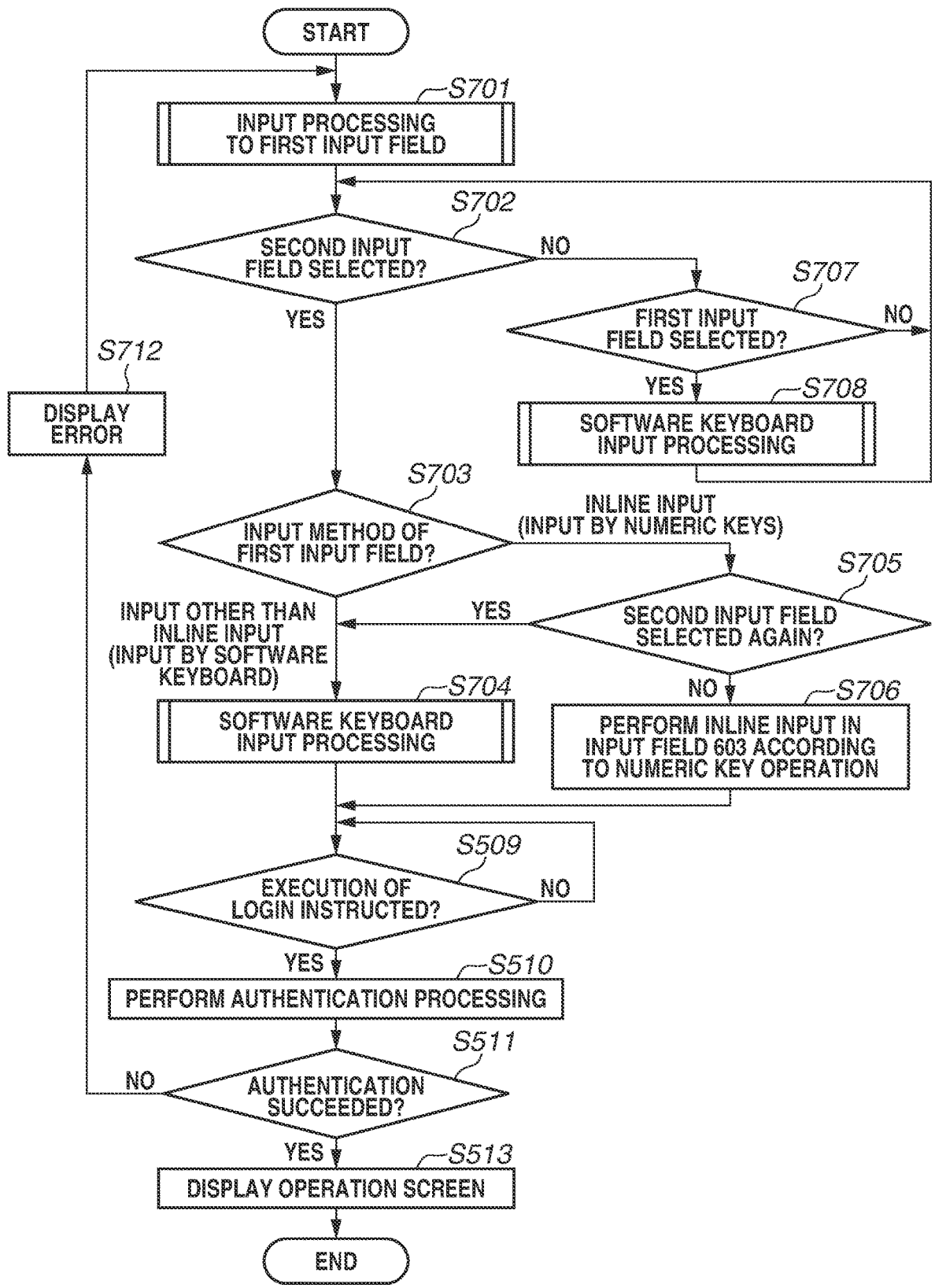

INFORMATION PROCESSING APPARATUS AND METHOD FOR CONTROLLING INFORMATION PROCESSING APPARATUS COMPRISING UTILIZING HARDWARE NUMERIC KEYS FOR CHARACTER STRING INPUT INTO INPUT REGIONS AND PRESSING AN INPUT REGION MULTIPLE INSTANCES TO DISPLAY A SOFTWARE KEYBOARD FOR CHARACTER STRING INPUT INTO AN INPUT REGION

BACKGROUND

Field of the Disclosure

The present disclosure relates to a technology to switch character input methods.

Description of the Related Art

Some existing devices include hardware for a display and numeric keys to allow a user to input numerals in an input field (input region) displayed on the display with use of the numeric keys.

The number of numeric keys is smaller than the number of keys in a software keyboard described below. Thus, the numeric keys and the input field may be disposed in different regions on the device. For example, the input field may be displayed on the display and the numeric keys may be disposed beside the display.

Providing the input field and operation keys at separate positions allows for inline input, which is an advantage. The inline input is an input method for directly displaying any of letters, numerals, and symbols (hereinafter, referred to as "characters") in the input field according to operation of the keys. The user can perform key operation while checking input of characters in the input field. For example, in a case where characters to be input are only numerals, the user can quickly input characters through numeric key operation.

In contrast, inputtable characters are limited through input by the numeric keys. Alternatively, a plurality of characters may be associated with one key and characters may be changed based on the number of pressing times of the key. This, however, increases the number of operation times of the key for character input and operation becomes complicated.

Thus, a device to display a software keyboard on a display has been made available. The software keyboard indicates a keyboard displayed on the display. The software keyboard is controlled so as to be displayed on the display at the time of operation requiring input of characters, and is controlled so as not to be displayed in a case where input of characters is unnecessary.

Japanese Patent Application Laid-Open No. 2009-157753 discusses, as an example of the device including the software keyboard, a multifunctional peripheral including functions of a printer, a copier, a scanner, and a facsimile.

In the character input with the software keyboard, various characters are inputtable with less user operation because the number of keys of the software keyboard is larger than the number of numeric keys.

In contrast, since the number of keys of the software keyboard is large, the input field and the software keyboard may not be displayed side by side at the same time in the device in which the display region is limited, such as the multifunctional peripheral as discussed in Japanese Patent Application Laid-Open No. 2009-157753. Therefore, in inputting characters, the software keyboard is displayed so as to be overlapped with the input field, and the display of the software keyboard is deleted after the character input, to display the input field. Since the input field is not displayed during display of the software keyboard, the above-described inline input is not performable.

As described above, each input method includes advantages and disadvantages, and it is accordingly desirable that the user can switch between the character input method allowing the inline input by using, for example, numeric keys and the character input method by using, for example, the software keyboard, depending on a situation and use it. The character input method allowing the inline input is not limited to the one with the numeric keys, and may be a method with a user interface realized by software.

In the technique discussed in Japanese Patent Application Laid-Open No. 2009-157753, the character input method to the input field is fixed. In other words, when the user inputs characters in an input field, the user cannot switch between the character input method allowing the inline input, such as the one with numeric keys, and the character input method with, for example, the software keyboard to use it.

SUMMARY

According to an aspect of the present disclosure, an information processing apparatus includes a memory device that stores a set of instructions, and at least one processor that executes the set of instructions to control a display unit to display an input region for input of at least any of letters, numerals, and symbols, execute first input processing to receive a first input instruction of at least any of letters, numerals, and symbols to the input region while the input region is being displayed, receive a second input instruction of at least any of letters, numerals, and symbols to the input region while the input region is not being displayed, execute second input processing to cause the display unit to display, after the second input instruction, the input region in which input according to the second input instruction has been performed. Whether to execute the first input processing or the second input processing is determined according to a user operation for input of at least any of letters, numerals, and symbols in the input region.

Further features of the present disclosure will become apparent from the following description of exemplary embodiments with reference to the attached drawings.

BRIEF DESCRIPTION OF THE DRAWINGS

FIG. 2 is a diagram illustrating an operation unit of the multifunctional peripheral.

FIG. 4 is a diagram illustrating screen transition according to one or more aspects of the present disclosure.

FIG. 5 is a flowchart illustrating an operation flow of the multifunctional peripheral according to one or more aspects of the present disclosure.

FIG. 7 is a flowchart illustrating an operation flow of a multifunctional peripheral according to one or more aspects of the present disclosure.

DESCRIPTION OF THE EMBODIMENTS

Some exemplary embodiments of the present disclosure are described below with reference to drawings.

A first exemplary embodiment will be described below in detail. The present exemplary embodiment is described with a multifunctional peripheral 100 as an example of an information processing apparatus according to the present disclosure. The multifunction peripheral 100 is a device in which functions of image forming apparatuses, such as a printer performing print processing, a copying machine, a scanner, and a facsimile, are integrated. The information processing apparatus is not limited to the multifunctional peripheral and may be a single-function apparatus including any of a printer, a copying machine, a scanner, and a facsimile.

Figure 1:
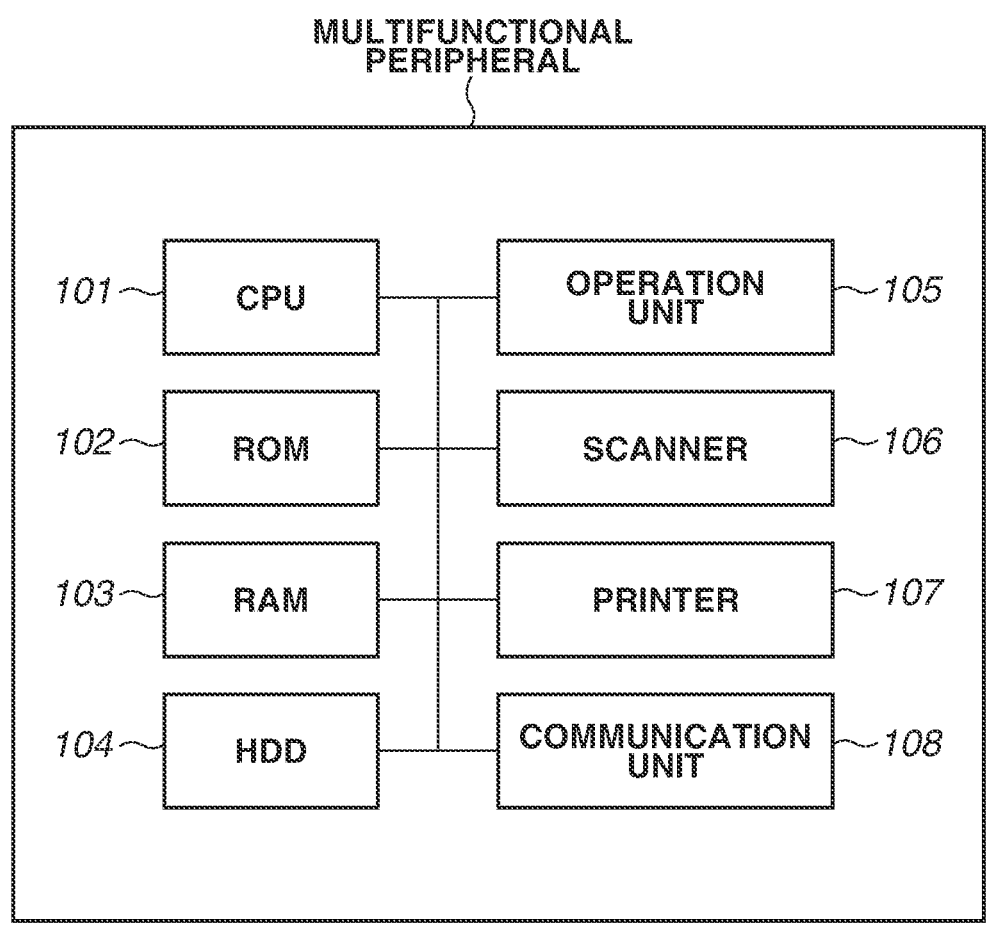
FIG. 1 is a diagram illustrating a hardware configuration of a multifunctional peripheral.

An example of a hardware configuration of the multifunctional peripheral 100 is describe with reference to FIG. 1. A central processing apparatus (CPU) 101 is a central processing apparatus (processor) that controls operation of the entire multifunctional peripheral 100. A random access memory (RAM) 103 is a volatile memory and is used as a temporal storage region for development of various kinds of control programs held in a work area, a read-only memory (ROM) 102, and a hard disk drive (HDD) 104.

The ROM 102 is a nonvolatile memory and holds, for example, a boot program of the multifunctional peripheral 100. The HDD 104 is a nonvolatile hard disk including a large capacity compared with the RAM 103. The HDD 104 holds a control program of the multifunctional peripheral 100. The HDD 104 also holds an operating system (OS) and application programs.

The CPU 101 executes the boot program held by the ROM 102 at startup of the multifunctional peripheral 100. The boot program is to read a program of the OS held by the HDD 104 and to develop the program in the RAM 103. The CPU 101 executes the boot program, and successively executes the program of the OS developed in the RAM 103 to control the multifunctional peripheral 100. The CPU 101 also stores, in the RAM 103, data used for operation by the control program, and performs reading and writing of the data.

In the multifunctional peripheral 100, one CPU 101 executes processing illustrated in flowcharts described below; however, the configuration is not limited thereto. For example, a plurality of CPUs and microprocessors (MPUs) may execute the processing illustrated in the flowcharts (described below) in cooperation with one another. A part of the processing (described below) may be executed with use of a hardware circuit, such as an application specific integrated circuit (ASIC) and a field-programmable gate array (FPGA).

An operation unit 105 provides an operation unit described below to a user. A scanner 106 reads a document and generates image data. The generated image data is transmitted to outside through a communication unit 108 or is used for printing by a printer 107.

The printer 107 prints the image data received from the outside through the communication unit 108 and the image data generated by the scanner 106.

The communication unit 108 is connected to a network such as a local area network (LAN) in an office and a telephone line for facsimile.

<Description of Operation Unit 105>

An example of the operation unit 105 of the multifunctional peripheral 100 is described with reference to FIG. 2. A display 201 is a touch-operable display. Touch operation is user's operation performed on a display panel of a display unit. The user does not necessarily need to touch the display, and the user may bring a finger or the like close to the display. Numeric keys 202 are hardware keys for input of at least any of letters, numerals, and symbols in an input region. The numeric keys 202 according to the present exemplary embodiment include keys of an asterisk sign and a "#" sign (number sign, parallel cross sign, or square) that are used in, for example, the facsimile, in addition to numerals.

According to the numeric keys 202, an input field (input region) described below and operation keys are disposed at different positions, which advantageously allows for so-called inline input. The inline input is an input method to directly display any of letters, numerals, and symbols (hereinafter, referred to as "characters") at a position of a cursor displayed in the input field, according to operation of keys. In other words, the inline input is input processing to receive an input instruction of at least any of letters, numerals, and symbols in the input region while the input region is being displayed. The user can perform key operation while checking input of the characters in the input field. For example, in a case where the characters to be input include only numerals, the user can quickly input the characters through numeric key operation.

According to the present exemplary embodiment, as the character input method allowing the inline input, numeric key input using hardware keys is described; however, the input method is not limited thereto. As the character input method allowing the inline input, a character input method using a graphical user interface that is realized by software, may be used.

For example, in a case of a software keyboard allowing flick input, a display region of the keyboard can be made smaller than that of a normal software keyboard. This enables display of the keyboard display region and the input field side by side in one screen. In such a manner, even the keyboard realized by software is able to realize the inline input. Here, the flick input is a character input method in which a plurality of character candidates are displayed around a key in response to specification of the key by a finger or the like, and the characters displayed around the specified key is selectable through flick operation, such as sliding of the finger from the specified key.

An identification (ID) key 203 is a button used by the user when the user logs in to or logs out from the multifunctional peripheral 100. For example, when the user inputs a username and a password in an input screen displayed on the display 201 and then presses down the ID key 203, user authentication is executed. When the authentication succeeds, a screen after login of the authenticated user is displayed. When the user logs in to the multifunctional peripheral 100, the user can perform operation to execute various functions of the multifunctional peripheral 100. Further, pressing down the ID key 203 while a user accesses the multifunctional peripheral 100 after logging in thereto causes the currently logged-in user to log out, and the screen returns to the screen to receive a username and a password.

A clear key 204 is a button to clear the numerals and the texts input in the display. A reset key 205 is a button used to collectively clear copy settings (e.g., sheet size, one-sided/double-sided, number of copies) set through the display or to collectively return the display of the screen to an initial state. A start key 206 is a button to instruct start of a job, such as scan operation of a document. A stop key 207 is a button to stop a scan job and a print job under operation.

<Software Configuration of Multifunctional Peripheral 100>

Figure 3A:
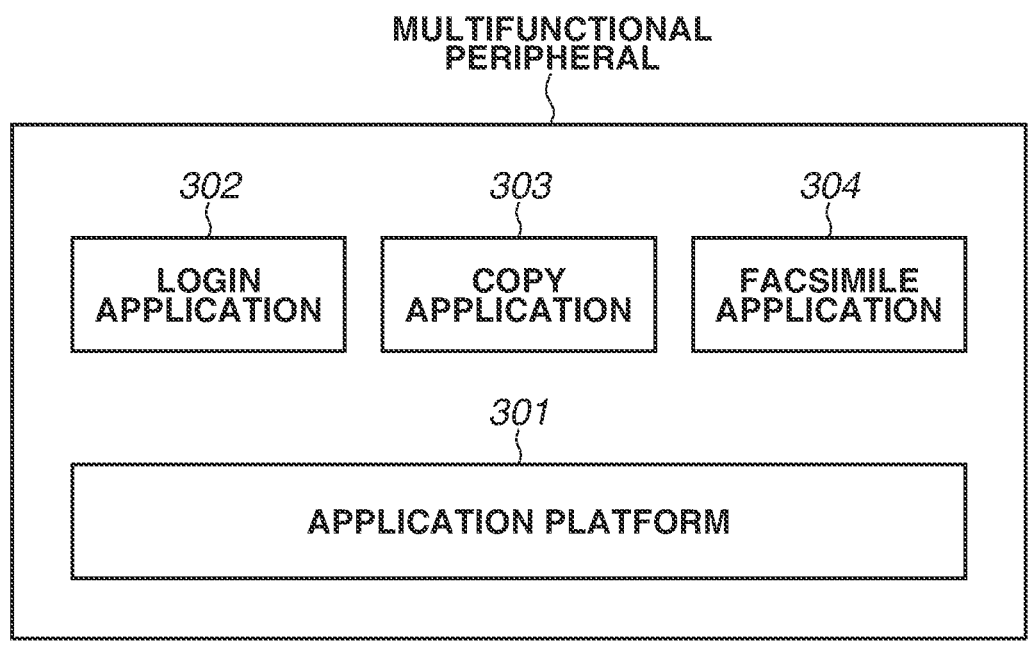
FIGS. 3A and 3B are diagrams each illustrating a software configuration of the multifunctional peripheral.

An example of a software configuration of the multifunctional peripheral 100 is described with reference to FIG. 3A. Software modules of FIG. 3A are realized by the CPU 101 loading a program held by the HDD 104 into the RAM 103 and executing the program. The module configuration of FIG. 3A is a non-limiting example. An application platform 301 provides an application programing interface (API) to an application. Each of applications of the multifunctional peripheral 100 can access the HDD 104, displays an operation user interface (UI) on the operation unit 105, uses functions of the scanner 106 and the printer 107, and uses the communication unit 108 to perform communication, through the API. Further, the application platform 301 encompasses drivers for use of the OS and the hardware.

A login application 302 displays a login screen on the operation unit 105 and authenticates the user trying to access the multifunctional peripheral 100. A copy application 303 is an application to display a UI of a copy function on the operation unit 105. A facsimile application 304 displays a UI of a facsimile function on the operation unit 105. These applications are merely examples and details of the applications are not limited.

Figure 3B:
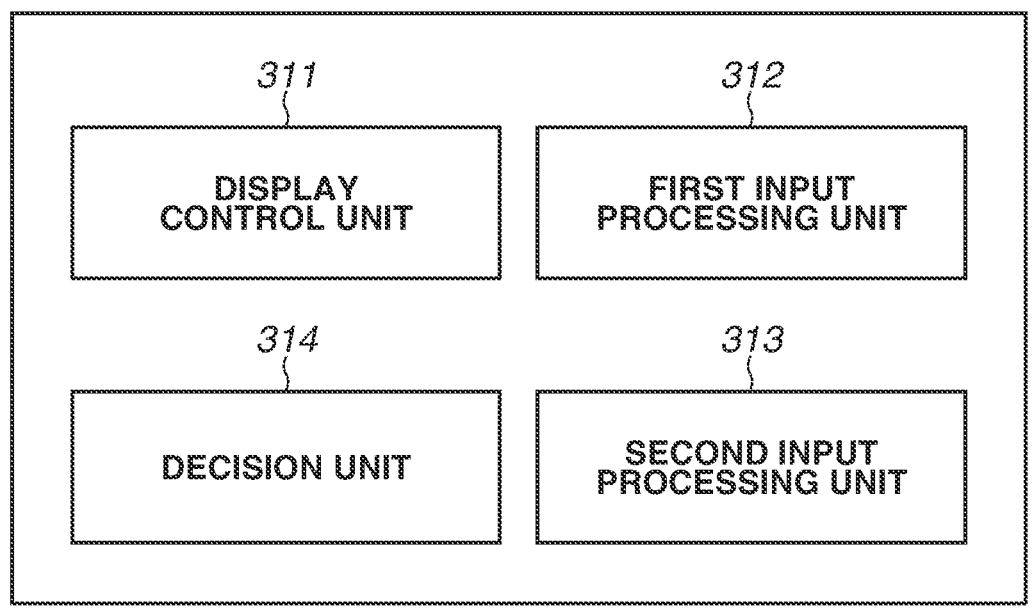

FIG. 3B is a functional block diagram of the multifunctional peripheral 100 according to the present exemplary embodiment. FIG. 3B is a block diagram relating to functions serving as character input to the operation unit of the multifunctional peripheral 100. According to the present exemplary embodiment, the functions are executed as programs in the application platform of FIG. 3A. A display control unit 311 perform control to cause the display unit to display the input field (input region) for input of at least any of letters, numerals, and symbols. A first input processing unit 312 executes first input processing to receive a first input instruction of at least any of letters, numerals, and symbols, to the input region while the input region is displayed. A second input processing unit 313 receives a second input instruction of at least any of letters, numerals, and symbols, to the input region while the input region is not displayed. Further, the second input processing unit 313 executes second input processing to cause the display unit to display, after the second input instruction, the input region where the input according to the second input instruction has been performed. A decision unit 314 performs control to determine whether to execute the first input processing or the second input processing, according to the user operation to input at least any of letters, numerals, and symbols, in the input region.

<Character Input Operation>

Next, character input operation according to the present exemplary embodiment is described with reference to FIGS. 4 and 5. According to the present exemplary embodiment, a description is provided of an example in which login information such as a username is input in the login screen displayed on the display 201. The login screen is displayed on the display 201 in response to execution of the login application 302 by the CPU 101.

In the present exemplary embodiment, a description is provided of an example of the login screen including one input field. In an example of FIG. 4, an input field 402 for input of a username is displayed on the login screen. FIG. 4 illustrates an example of screen transition of the login screen displayed on the display 201.

In the present exemplary embodiment, it is assumed that a management table of user accounts illustrated in Table 1 is previously held by the HDD 104. The management table illustrated in Table 1 includes a field of a username. In the example of Table 1, mail addresses are managed in association with respective users. In the management table, authority information, screen layout setting, etc. of each of the users may be managed in association with the corresponding one of the usernames without limitation to the mail address.

In a case where the username input in the input field 402 and the username listed in the management table are coincident with each other, the login application 302 allows the user to log in to the multifunctional peripheral 100. It is sufficient for the username to be the information enabling identification of the user. The information enabling identification of the user may be, for example, an optional number assigned to individual users.

TABLE 1

| Username | Mail Address |
|---|---|
| Alice | alice@company.com |
| Bob | bob@company.com |
| Carol | carol@company.com |
| 01234 | 01234@company.com |
| 01235 | 01235@company.com |
| ... | ... |

The login processing according to the present exemplary embodiment is described with reference to FIG. 5. The processing of FIG. 5 is realized by the CPU 101 loading, into the RAM 103, the login application 302 read out from the HDD 104 and executes the loaded login application 302. Alternatively, a control application that controls character input processing of the login application 302 may be separately prepared, and the CPU 101 may execute the control application to realize the processing illustrated in FIG. 5.

First, in step S501, the CPU 101 displays the login screen 401. For example, in a case where the user performs instruction to display the login screen while the user does not log in to the multifunctional peripheral 100, the CPU 101 displays the login screen 401. Alternatively, in a case where the user does not log in to the multifunctional peripheral 100 and the display 201 displays the screen display (e.g., in case other than power-saving state and power-off state), the CPU 101 may display the login screen 401.

The input field 402 for input of the username is displayed in the login screen 401. As described above, it is sufficient for the username to be the information enabling identification of the user. For example, the information enabling identification of the user may be an optional number assigned to individual users.

Next, in step S502, the CPU 101 determines whether operation to the login screen 401 has been performed. In the present exemplary embodiment, the operation to the login screen 401 includes operation of the numeric keys 202. Further, in the present exemplary embodiment, the operation to the login screen 401 includes touch operation with a finger to specify the input field 402. In this example, in the touch operation, the finger is not necessarily brought into contact with the display 201, and approach of the finger to the input field 402 may be detected. The touch operation is not limited to operation with the finger, and operation indicating selection of the input field 402 may be adopted.

In a case where the operation to the login screen 401 has not been performed (NO in step S502), the CPU 101 repeats the process in step S502. In contrast, in a case where the operation to the login screen 401 is detected (YES in step S502), the CPU 101 determines what operation is performed in step S503.

For example, the CPU 101 determines whether the operation is operation (first operation) to input characters in the input field 402 through the inline input or operation (second operation) to call a software keyboard with inline input to the input field 402 not being performed.

The inline input is a character input method for directly displaying characters in the input field 402 according to key operation. The user can perform key operation while confirming input of the characters in the input field. In the present exemplary embodiment, the CPU 101 determines that the operation for inline input has been performed in a case where any of the numeric keys 202 is pressed down; however, the determination is not limited thereto. The key operation is not limited to the one using hardware keys. Software may be executed and keys displayed on the display 201 may be operated to perform the inline input. The inline input is performable if the input field 402 is also displayed in a case where the keys are displayed.

In the present exemplary embodiment, in a case where the operation to select the input field 402 has been performed, the CPU 101 determines that the operation to call the software keyboard without performing the inline input to the input field 402. The selection of the input field 402 may be performed through, for example, touch operation to the input field 402 or operation of the hardware keys to select the input field 402.

In a case where the CPU 101 determines that any of the numeric keys 202 has been operated as the operation to the login screen 401, the CPU 101 inputs characters in the input field 402 through the inline input according to the numeric key operation in step S504. For example, the CPU 101 displays, in the input field 402, characters corresponding to the operated numeric keys. A screen example after the username is input through the numeric key operation is illustrated in a login screen 403. If the CPU 101 completes the process in step S504, the processing proceeds to step S509.

In contrast, in a case where the CPU 101 determines in step S503 that the touch operation to the input field 402 has been performed as the operation to the login screen 401, the CPU 101 displays a software keyboard on the display 201 (step S505). A screen example in a case where the software keyboard is displayed on the display 201 is illustrated in a screen 404. In the example of FIG. 5, the software keyboard is displayed on the entire screen of the display 201. Accordingly, the input field 402 for input of the username is not displayed on the display 201. Instead, an input field 405 for displaying the characters indicated by the software keyboard is displayed above the software keyboard.

When the keys of the software keyboard are operated, the CPU 101 displays, in the input field 405, the characters according to the key operation in step S506. The screen 404 illustrates a state where a character string of "Alice" is displayed in the input field 405 of the software keyboard.

Subsequently, in step S507, the CPU 101 determines whether decision instruction to determine the characters input by the software keyboard has been performed. For example, the decision instruction may be input through operation of Enter key on the software keyboard.

In a case where the decision instruction has not been performed (NO in step S507), the process in step S506 is repeated. In a case where the decision instruction has been performed (YES in step S507), the CPU 101 displays a login screen 406 in place of the software keyboard (screen 404). At this time, in step S508, the characters input in the input field 405 of the software keyboard are displayed in the input field 402 of the login screen 406. After the CPU 101 executes the process in step S508, the CPU 101 executes a process in step S509.

The software keyboard processing in steps S505 to S508 enables input instruction of at least any of letters, numerals, and symbols to the input region to be received with the input region being not displayed. In addition, the input processing that causes the display unit to display the input region where the input according to the input instruction has been performed, after the input instruction, is performed.

In step S509, the CPU 101 determines whether login execution has been instructed. In a case where a login button 407 of the login screen 403 or the login screen 406 is pressed down, the CPU 101 determines that login execution been instructed. Further, in a case where the CPU 101 detects that the ID key 203 is pressed down while the login screen 403 or the login screen 406 is being displayed, the CPU 101 determines that login execution has been instructed. In a case where login execution is not instructed (NO in step S509), the process in step S509 is repeated. In a case where the CPU 101 determines that login execution has been instructed (YES in step S509), user authentication processing is executed (step S510).

In step S511, the CPU 101 determines whether the characters input in the input field 402 of the login screen are coincident with the username managed in Table 1 in the authentication processing. In a case where the username corresponding to the characters input in the input field 402 of the login screen exists in Table 1, the CPU 101 determines that the authentication has succeeded. In a case where the corresponding username does not exist in Table 1, the CPU 101 determines that the authentication has failed.

In a case where the CPU 101 determines that the authentication has failed (NO in step S511), the CPU 101 displays information indicating authentication failure or information prompting a user to retype the user ID on the display 201 in step S512, and the processing returns to step S501.

In the case where the CPU 101 determines that the authentication has succeeded (YES in step S511), an operation screen for operation of the multifunctional peripheral 100 is displayed on the display 201 in step S513, and the login of the user is completed.

In a case where the CPU 101 detects that the clear key 204 or the reset key 205 is pressed down in the login screen 403 or 406, the CPU 101 deletes all of the characters input in the input field 402 and displays the login screen 401 in an initial state.

According to the above-described configuration, characters are inputtable through any input method out of the input with the software keyboard and the input with the numeric keys in inputting a username for login. The configuration enables the user to dynamically switch the input methods for inputting the characters in the input field depending on a situation and use it. Further, the input method is determined through operation of the numeric keys 202 or selection of the input field without previous specification of the input method. This enables the user to intuitively perform operation.

The character input in the login application has been described as an example in the present exemplary embodiment; however, the present exemplary embodiment is applicable to character input processing in other applications.

A second exemplary embodiment of the present disclosure will be described below in detail. In the present exemplary embodiment, a case where two or more input fields are provided is described. A hardware configuration and a software configuration in the second exemplary embodiment are similar to those in the first exemplary embodiment, and description thereof is accordingly omitted.

Figure 6:
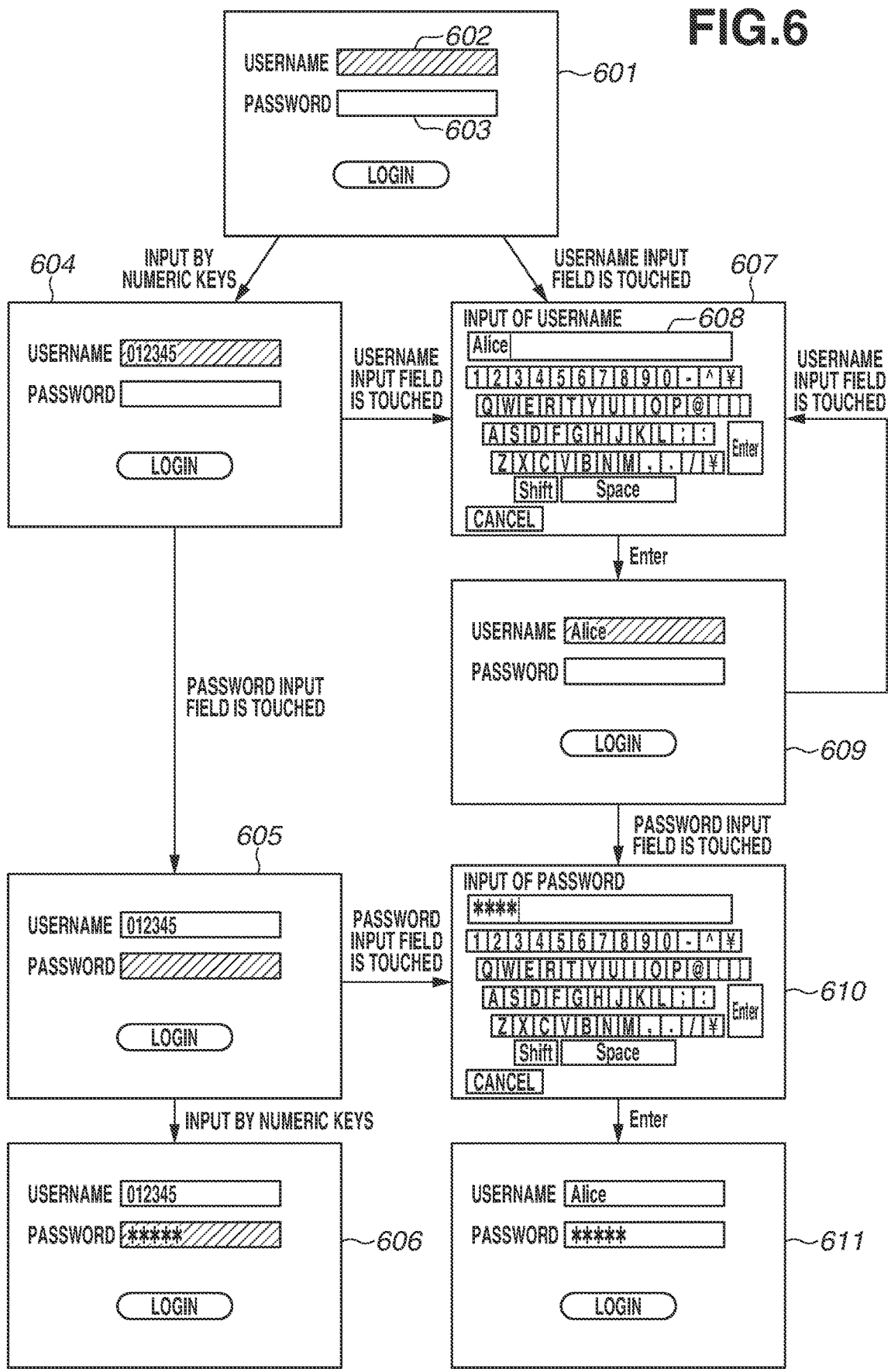
FIG. 6 is a diagram illustrating screen transition according to one or more aspects of the present disclosure.

Operation in the case where the login screen includes two or more input fields is described with reference to FIGS. 6 and 7. In the present exemplary embodiment, FIG. 6 illustrates an example of screen transition of the login screen that is displayed on the display 201 by the login application 302.

A login screen 603 includes an input field 603 for input of a password, in addition to an input field 602 for input of a username. In FIG. 6, input fields represented with the hatch lines are each a target of character input in response to pressing of the numeric keys 202 or a target of character deletion in response to pressing of the clear key 204. Information indicating a target of the character input may be displayed on the target input field. For example, the target input field may be surrounded by a predetermined frame or a color of the target input field may be changed to a predetermined color.

Further, in the present exemplary embodiment, it is assumed that a management table of user accounts illustrated in Table 2 is previously stored in the HDD 104.

In a case where a combination of the username input in the input field 602 and the password input in the input field 603 is coincident with those stored in the management table, the login application 302 allows the user to log in to the multifunctional peripheral 100. It is sufficient for the username to be the information enabling identification of the user. The information enabling identification of the user may be, for example, an optional number assigned to individual users. Further, the password may include only letters, only numerals, a combination of letters and numerals. In addition, symbols, signs, and the like may be used. The input characters may be masked with, for example, asterisk in the input field of the text password.

TABLE 2

| Username | Password | Mail Address |
|---|---|---|
| Alice | password | alice@company.com |
| Bob | 123456 | bob@company.com |
| Carol | 987654 | carol@company.com |
| 01234 | 456789 | 01234@company.com |
| 01235 | password | 01235@company.com |
| . . . | . . . | . . . |

Operation of the login application 302 according to the present exemplary embodiment will be described with reference to FIG. 7. The processing of FIG. 7 is realized by the CPU 101 loading, into the RAM 103, the login application 302 read out from the HDD 104 and executing the login application 302. Alternatively, a control application that controls character input processing of the login application 302 may be separately prepared, and the CPU 101 may execute the control application to realize the processing illustrated in FIG. 7.

After the CPU 101 displays the login screen 601, the CPU 101 performs input processing to the username input field 602 (first input field) in step S701. The process of the login application 302 in step S701 is similar to the processes in steps S501 to S508 described with reference to FIG. 5 in the first exemplary embodiment. The login screen 401 of FIG. 5, however, is replaced with the login screen 601 and the input field 402 is replaced with the input field 602 in the present exemplary embodiment.

In a case where the inline input using the numeric keys is performed in step S701, a login screen 604 in FIG. 6 is displayed. In contrast, in a case where the characters are input by the software keyboard in step S701, a login screen 609 of FIG. 6 is displayed. FIG. 6 illustrates a non-limiting example in which the username input field 602 is a target field of character input is illustrated. Alternatively, in a case where Enter key is pressed down in the software keyboard 607, the login screen 609 may be displayed in a state where the password input field 603 becomes a target field of character input.

Next, in step S702, the CPU 101 determines whether the password input field 603 (second input field) has been selected. For example, the user performs touch operation on the input field 603 to select the input field 603. A selection method of the input field 603 is not limited thereto, and the input field 603 may be selected based on operation of a hardware key or a software key.

In a case where the password input field 603 has not been selected (NO in step S702), the processing proceeds to step S707. In step S707, the CPU 101 again determines whether the username input field 602 has been selected. In a case where the username input field 602 has been selected (YES in step S703), the processing proceeds to step S708. In step S708, the software keyboard input processing is performed. The software keyboard input processing in step S708 is similar to the processes in steps S505 to S508 described with reference to FIG. 5 in the first exemplary embodiment. The input field 405, however, is replaced with an input field 608 of the software keyboard in FIG. 6. Further, the input field 402 is replaced with the input field 602 in FIG. 6.

Transition from the process in step S707 to the process in step S708 corresponds to screen transition from the login screen 604 to the software keyboard 607 in FIG. 6 and screen transition from the login screen 609 to the software keyboard 607 in FIG. 6.

In step S707, in a case where the username input field 602 has not been selected (NO in step S707), the processing returns to step S702 and selection of the input field by the user is waited.

In a case where the password input field 603 has been selected in step S702 (YES in step S702), the processing proceeds to step S703. In step S703, the CPU 101 determines whether the input method of inputting the username in the username input field 602 has been numeric key input or software keyboard input. At this time, the numeric key input corresponds to the inline input, and the software keyboard input corresponds to an input method other than the inline input.

In a case where the character input method in the username input field 602 is software keyboard input, the CPU 101 displays a software keyboard 610 and performs software keyboard processing in step S704. The software keyboard processing in step S704 is similar to the processes in steps S505 to S508 described with reference to FIG. 5 in the first exemplary embodiment. The input field 405 in FIG. 5, however, is replaced with the input field 608 of FIG. 6, and the input field 402 in FIG. 5 is replaced with the password input field 603 of FIG. 6.

Transition from the process in step S703 to the process in step S704 corresponds to screen transition from the login screen 609 to the software keyboard 610 in FIG. 6.

In a case where the input method of the username input field 602 is numeric key input in step S703, the CPU 101 determines whether the password input field 603 has been selected again in step S705.

The selection of the password input field again indicates that the password input field 603 is selected in step S702 and the password input field 603 is further selected in step S705. In the example of FIG. 6, the selection again corresponds to the case where the first selection is performed in transition from the login screen 604 to the login screen 605 and the second selection is performed in transition from the login screen 605 to the software keyboard 610. The first selection is selection processing to change a filed as a character input target from the username input field 602 that is currently selected to the password input field 603. The second selection is selection processing to change the character input method for the password input field 603 from the input method with the numeric keys which is currently selected to the input method with the software keyboard.

Changing the filed as the character input target from the username input field 602 which is currently selected to the password input field 603 may be executed when a symbol key out of the numeric keys 202 is pressed down. The symbol key is, for example, a key to input an asterisk sign or a number sign.

In a case where the password input field 603 has been selected again in step S705 (YES in step S705), the processing proceeds to step S704, and the CPU 101 performs software keyboard processing. The characters input in the input field 608 of the software keyboard 610 are displayed in the input field 603 of the login screen 611. In a case where it is determined that the password input field 603 has not been selected again in step S705 (NO in step S705), the CPU 101 determines that the input method of the input field 603 is numeric key input. In step S706, inline input is performed according to the numeric key operation. The login screen 606 is the login screen after inline input is performed according to the numeric key operation.

As described above, in the case where the inline input has been performed on the first input field, control is performed such that the character input method of the second input field becomes the inline input when the second input field is selected. Further, in the case where the second input field is selected again, the control is performed such that the character input method of the second input field becomes an input method other than the inline input (e.g., software keyboard input).

After the process in step S704 or the process in step S706 ends, the CPU 101 executes the login processing according to the login execution instruction. Description of the login execution processing is omitted because the login execution processing is similar to the processes in steps S509 to S513 described with reference to FIG. 5 in the first exemplary embodiment.

In a case where the CPU 101 detects that the clear key 204 is pressed down in the login screen, the CPU 101 clears the characters in the currently-selected input field. In a case where the CPU 101 detects that the reset key 205 is pressed down in the login screen, the CPU 101 clears the character strings in the text input fields for both of the username and the password, and puts the login screen into the initial state (login screen 601). Further, an asterisk key or a number key of the numeric keys 202 may be used for focus movement of the input fields (selection change).

Further, in the above-described exemplary embodiment, the case where the first input field is the username input field 602 and the second input field is the password input field 603 has been described; however, the username input field and the password input field may be exchanged. In other words, the first input field may be the password input field 603, and the second input field may be the username input field 602.

Further, the character input in the login application has been described as an example in the present exemplary embodiment; however, the present exemplary embodiment is applicable to character input processing in other applications.

According to the present exemplary embodiment, it is possible to continuously use the character input method for the first input field as the input method for the second input field in a case where the character input field is changed from the first input field to the second input field. Additionally, even in a case where the input method is automatically taken over in the above-described manner, it is possible to change the character input method for the second input field to an input method different from the character input method for the first input field according to the user instruction.

In other words, an instruction to change the input target to a second input region is received in a state where the first input processing such as numeric key input has been executed on a first input region and at least any of characters, numerals, and symbols have been input in the first input region. Further, it is determined to execute the first input processing on the second input region. After the decision, it is further determined to execute the second input processing on the second input region based on further reception of the instruction to select the second input region.

The character input method is dynamically switched in the above-described manner, thus improving the operability for the user.

An example of the character input method suitable for each user is described with reference to Table 2. As for a user Alice, letters are included in the username and the password. Thus, the software keyboard allowing letter input is desirably used for input of the username and the password.

In contrast, as for a user 01234, the username and the password include only numerals. Thus, the text input operation is performable with use of only the numeric keys 202 without the software keyboard.

As for users Bob and Carol, the software keyboard is used because the username includes letters; however, the numeric keys 202 can be used for input of the password because the password only includes numerals.

Moreover, as for a user 01235, the numeric keys 202 are used for input of the username because the username includes only numerals, and the software keyboard is used for input of the password because the password includes letters.

As described above, it is desirable that the input method is appropriately changed depending on whether the username and the password include letters or only numerals and the input is performed.

According to the present exemplary embodiment, the character input method is appropriately dynamically changed over, which makes it possible to improve operability for the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-136587, filed Jul. 12, 2017, which is hereby incorporated by reference herein in its entirety.

What is claimed is:

1. An information processing apparatus, comprising:
   one or more memories storing instructions; and
   one or more processors executing the instructions to cause the information processing apparatus to:
   display a plurality of input regions for input of a character string, the plurality of input regions including at least a first input region and a second input region which are to receive an input by a software keyboard;
   focus the first input region in accordance with reception of one touch operation on the first input region that is not being focused, wherein the software keyboard is not displayed in accordance with the reception of the one touch operation;
   display the software keyboard for input to the first input region in accordance with reception of further one touch operation on the first input region that is being focused;
   hide the displayed software keyboard in accordance with reception of a predetermined operation;
   display, in accordance with reception of one touch operation on the second input region that is not being focused, the software keyboard for input to the second input region based on the software keyboard having been used for the input to the first input region.

2. The information processing apparatus according to claim 1, wherein at least one of the plurality of input regions is a region for input of a username or a password used by the user to log in to the information processing apparatus.

3. The information processing apparatus according to claim 1, wherein the information processing apparatus is an image forming apparatus configured to perform print processing.

4. A method for controlling an information processing apparatus, the method comprising:
   displaying a plurality of input regions for input of a character string, the plurality of input regions including at least a first input region and a second input region which are to receive an input by numeric keys or a software keyboard,
   focusing the first input region in accordance with reception of one touch operation on the first input region that is not being focused, wherein the software keyboard is not displayed in accordance with the reception of the one touch operation;
   displaying the software keyboard for input to the first input region in accordance with reception of further one touch operation on the first input region that is being focused;
   hide the displayed software keyboard in accordance with reception of a predetermined operation;
   displaying the character string input with the software keyboard in the first input region; and
   displaying, in accordance with reception of one touch operation on the second input region that is not being focused, the software keyboard for input to the second input region based on the software keyboard having been used for the input to the first input region.

5. The information processing apparatus according to claim 1, wherein in a case where the touch operation is received once on the second input region that is not being focused, the second input region is being focused.

6. The information processing apparatus according to claim 1, wherein, in a case where the software keyboard is displayed, a display screen is shifted to a screen including the software keyboard.

7. The information processing apparatus according to claim 1, wherein the software keyboard is not displayed in a case where the touch operation is received once on the second input region that is not in the focused state after a character string is input to the first input region using numeric keys.

8. The information processing apparatus according to claim 1, wherein a state that the first input region is focused is a state that input by numeric keys is enabled.

9. The information processing apparatus according to claim 1, wherein a state that the first input region is focused is a state that the software keyboard is not displayed.

10. The information processing apparatus according to claim 1, wherein, in accordance with reception of one touch operation on the second input region that is not being focused, based on the software keyboard having not been used for input to the first input region, the software keyboard for input to the second input region is not displayed.

11. The information processing apparatus according to claim 1, wherein, in accordance with reception of one touch operation on the second input region that is not being focused in a state where the first input region is being focused, focus is moved from the first input region to the second input region, and, based on the software keyboard having been used for input to the first input region, the software keyboard for input to the second input region is displayed.

12. The information processing apparatus according to claim 1, wherein the one or more processors executing the instructions to further cause the information processing apparatus to store an input method that has been used for input to the first input region, wherein, in accordance with receiving one touch operation on the second input region that is not being focused, displaying and hiding of the software keyboard are switched based on the stored input method.

13. The information processing apparatus according to claim 1,
   wherein an input using numeric keys are allowed for the first input region and the second input region,
   wherein, in a case where one touch operation on the second input region that is not being focused after input to the first input region has been performed using the numeric keys is received, control is performed so as not to display the software keyboard, and wherein, in a case where one touch operation on the second input region that is not being focused after the input to the first input region has been performed using the software keyboard is received, control is performed so as to display the software keyboard.

14. The information processing apparatus according to claim 1, wherein the one or more processors executing the instructions further causes the information processing apparatus to display, in accordance with reception of one touch operation on the second input region that is not being focused, the software keyboard for input to the second input region and focus the second input region based on the software keyboard having been used for the input to the first input region.

15. The information processing apparatus according to claim 1, wherein the software keyboard is displayed below a field that shows the characters input by the software keyboard when switching from displaying at least one of the plurality of input regions to a screen showing the field and the software keyboard.

\* \* \* \* \*